United States Patent [19]

Mizuno et al.

[11] Patent Number: 4,780,490

[45] Date of Patent: Oct. 25, 1988

[54] AQUEOUS DISPERSION OF PARTICLES OF A FLUORINE-CONTAINING-COPOLYMER AND ITS USE

[75] Inventors: Toshio Mizuno; Norimasa Honda, both of Osaka; Shoji Kawachi, Nishinomiya; Tetsuo Shimizu; Masafumi Akamatsu, both of Osaka, all of Japan

[73] Assignee: Daikin Industries, Ltd., Osaka, Japan

[21] Appl. No.: 927,378

[22] Filed: Nov. 6, 1986

[30] Foreign Application Priority Data

Nov. 6, 1985 [JP] Japan .................................. 60-249650

[51] Int. Cl.$^4$ .............................................. C08L 83/00
[52] U.S. Cl. .................................... 523/201; 524/535; 524/458; 525/276; 525/902
[58] Field of Search ................ 523/201; 524/535, 458; 525/276, 902

[56] References Cited

U.S. PATENT DOCUMENTS

| | | | |
|---|---|---|---|
| 3,631,141 | 12/1971 | Fang | 524/545 |
| 4,134,995 | 1/1979 | Fumoto | 526/80 |
| 4,391,940 | 7/1983 | Kuhls | 525/276 |
| 4,469,846 | 9/1984 | Khan | 525/72 |
| 4,636,549 | 1/1987 | Gangal | 523/201 |

*Primary Examiner*—Joseph L. Schofer
*Assistant Examiner*—Peter Mulcahy
*Attorney, Agent, or Firm*—Birch, Stewart, Kolasch & Birch

[57] ABSTRACT

An aqueous dispersion comprising an aqueous medium and colloidal particles of a fluorine-containing copolymer having an average particle size of about 0.05 to 1.0 um dispersed therein, each colloidal particle being constructed with a core portion made of a polymer comprising about 99 to 100% by weight of units of tetrafluoroethylene and about 0 to 1% by weight of units of at least one other fluoroolefin and a shell portion made of a polymer comprising about 50 to 97% by weight of units of tetrafluoroethylene and about 3 to 50% by weight of units of chlorotrifluoroethylene, the amount of chlorotrifluoroethylene in the core and shell portions being from about 2.5 to 25% by weight based on the entire amount of the core and shell portions.

3 Claims, No Drawings

AQUEOUS DISPERSION OF PARTICLES OF A FLUORINE-CONTAINING-COPOLYMER AND ITS USE

BACKGROUND OF THE INVENTION

The present invention relates to an aqueous dispersion of particles of a fluorine-containing copolymer and its use. More particularly, it relates to a novel aqueous dispersion of particles of a fluorine-containing copolymer and its use for preparation of an organosol composition.

BACKGROUND OF THE INVENTION

Organosol compositions comprising tetrafluoroethylene polymers such as polytetrafluoroethylene are useful as coating compositions, which can afford coating films excellent in lubricity, anti-staining property, corrosion resitance, etc. Such organosol compositions can be produced by adding an organic liquid medium having a boiling point of not lower than 100° C. to an aqueous dispersion of colloidal particles of a tetrafluoroethylene polymer obtained by emulsion polymerization and eliminating water from the resultant mixture under heating. When the colloidal particles of a tetrafluoroethylene polymer as obtained by emulsion polymerization are once coagulated, the coagulated particles can be hardly dispersed into an organic liquid medium. Because of this reason, additives such as surfactants or tetrafluoroethylene/hexafluoropropene copolymer are added to said aqueous dispersions of colloidal particles so as to prevent coagulation of the colloidal particles therein [U.S. Pat. No. 2,937,156, British Pat. No. 1,094,349 and Japanese Patent Publication (examined) No. 17548/73].

However, a coating film, which is obtained by the use of an organosol composition prepared from an aqueous dispersion of colloidal particles of a tetrafluoroethylene polymer and incorporated with a surfactant is apt to produce blister and color change. A coating film, which is obtainable by the use of an organosol composition prepared from an aqueous dispersion of colloidal particles of a tetrafluoroethylene polymer and incorporated with tetrafluoroethylene/hexafluoropropene copolymer produces a marked depression in lubricity even when abraded a little. If and when the additive such as a surfactant or tetrafluoroethylene/hexafluoropropene copolymer is not incorporated, said problem will not be produced. In such a case, however, the colloidal particles in the aqueous dispersion tend to be coagulated, and thus the coagulated particles can hardly be dispersed into an organic liquid medium as stated above. Application of a shear force by vigorous agitation to the coagulated particles for making them dispersed into an organic liquid medium rather results in fibrillation and solidification. Thus, incorporation of said additive is indispensable.

SUMMARY OF THE INVENTION

Aiming at providing the collidal particles of a tetrafluoroethylene polymer (i.e. a polymer comprising units of tetrafluoroethylene as the major component) which can be easily dispersed into an organic liquid medium to give an organosol composition or of which the aqueous dispersion can be readily converted into an organosol composition without using any additive, an extensive study has been made, and as a result, it has now been found that the colloidal particles of a tetrafluoroethylene polymer having a certain specific monomeric composition are quite suitable for such use. This invention is based on the above finding.

A main object of the present invention is to provide an aqueous dispersion of colloidal particles of a fluorine-containing copolymer comprising units of tetrafluoroethylene as the major component, which is suitable for production of an organosol composition. Another object of this invention is to provide an organosol composition comprising said colloidal particles of the fluorine-containing copolymer, which is suitable for coating an article to impart lubricity, anti-staining property, corrosion resistance, etc., thereto.

According to the present invention, there is provided (1) an aqueous dispersion comprising an aqueous medium and the colloidal particles of a fluorine-containing copolymer having an average particle size of about 0.05 to 1.0 μm dispersed therein, each colloidal particle being constituted with a core portion made of a polymer comprising about 99 to 100% by weight of units of tetrafluoroethylene (TFE) and about 0 to 1% by weight of units of at least one other fluoroolefin and a shell portion made of a polymer comprising about 50 to 97% by weight of units of tetrafluoroethylene (TFE) and about 3 to 50% by weight of units of chlorotrifluoroethylene (CTFE), the amount of chloroetrifluoroethylene (CTFE) in the core and shell portions being from about 2.5 to 25% by weight basd on the entire amount of the core and shell portions.

There is also provided (2) an organosol composition comprising an organic liquid medium and said colloidal particles of the fluorine-containing copolymer dispersed therein.

DETAILED DESCRIPTION OF THE INVENTION

The aqueous dispersion (1) can be prepared, for instance, by polymerizing first about 99 to 100% by weight of TFE and about 0 to 1% by weight of at least one other fluoroolefin in an aqueous medium in the presence of an anionic type surfactant or emulsifier having no telogen activity and then polymerizing about 50 to 97% by weight of TFE and about 3 to 50% by weight of CTFE in the resulting reaction mixture. The polymerization procedure is per se known (Japanese Patent Publication (examined) No. 26242/81).

The content of the colloidal particles (i.e. copolymer particles) in the aqueous dispersion (1) thus produced is usually from about 10 to 50% by weight, preferably from about 20 to 40% by weight. The weight proportion of the core portion and the shell portion in each colloidal particle is usually from about 95:5 to 30:70, preferably from about 80:20 to 35:65. The average particle size is usually from about 0.05 to 1 μm, preferably from about 0.1 to 0.5 μm.

Examples of said fluoroolefin are a compound of the formula: $X(CF_2)_mO_nCF=CF_2$ (wherein X is hydrogen, chlorine or fluorine, m is an integer of 1 to 6 and n is an integer of 0 or 1), a compound of the formula: $C_3F_7O(CF(CF_3)CF_2O)_pCF=CF_2$ (wherein p is an integer of 1 or 2), CTFE (chlorotrifluoroethylene), vinylidene fluoride VdF), trifluoroethylene (TrFE), etc.

When TFE is contained in the core portion of the copolymer particle within said range, the resultant organosol composition gives a coating film excellent in abrasion resinstance, lubricity, etc.

When the content of CTFE in the core portion of the copolymer particle is less than the lower limit of said range (e.g. modified PTFE as disclosed in Japanese Patent Publication (examined) No. 26242/81), the copolymer particles are apt to be fabrillated by application of the shear force thereto, and their dispersion stability in the organosol composition is deteriorated. When the CTFE content is more than the higher limit of said range, the organosol composition gives a coating film being inferior in abrasion resistance, lubricity, mold releasing property, etc.

The organosol composition (2) of the invention can be prepared by subjecting the aqueous dispersion (1) to a series of steps as set forth below:

(a) To the aqueous dispersion (1), an organic compound, which is in a liquid state around room temperature and immiscible or hardly miscible with water (i.e. a phase transfer liquid), is added in an amount of about 50 to 500 parts by weight, preferably of about 100 to 200 parts by weight, per 100 parts by weight of the fluorine-containing copolymer in said aqueous dispersion, followed by mild agitation.

(b) To the resulting mixture, an aqueous solution of an electrolyte or an organic substance which can be dissolved into water in an optional proportion (i.e. a phase transfer agent) is added in an amount of about 50 to 2,000 parts by weight, preferably of about 250 to 1,000 parts by weight, per 100 parts by weight of the fluorine-containing copolymer, followed by stirring mildly, and the resultant mixture is allowed to stand.

(c) The fluorine-containing copolymer is precipitated together with the phase transfer liquid as used in (a), and the supernatant mainly comprising water is eliminated. To the precipitate, an organic liquid medium is added.

(d) The thus obtained mixture is heated at abouty 100° C. under agitation to eliminate water by evaporation, whereby the water content therein is made below 500 ppm.

(e) When desired, a film forming material as hereinafter mentioned is added to the resultant mixture.

The phase transfer liquid may be, for instance, hexane, heptane, octane, benzene, toluene, methylisobutylketone or the like.

The electrolyte in the phase transfer agent may be chosen, for instance, from alkali metal or alkaline earth metal salts (e.g. sodium sulfate, magnesium chloride, sodium formate, potassium acetate). The concentration of the electrolyte is usually from about 0.01 to 50% by weight, preferably from about 0.1 to 10% by weight. Examples of the organic substance usable as the phase transfer agent are those being in a liquid state at room temperature and having a boiling point of not more than 200° C. (e.g. acetone, methanol).

The organic liquid medium usable for the organosol composition is the one being immiscible or hardly miscible with water and boiled with water to make an azeotropic mixture. Speific examples are aromatic hydrocarbons (e.g. benzene, toluene, xylene), ketones (e.g. methylisobutylketone, diisobutylketone), etc. Among them, toluene or methylisobutylketone is the most preferable.

The organosol composition (2) may be incorporated with a film forming material such as a thermoplastic resin or a thermosetting resin for enhancement of any physical property (e.g. strength, lubricity) of the coating film prepared therefrom. Examples of the film forming material are nitrocellulose, cellulose acetate butyrate, alkyd resin, polyester resin, polyurethane resin, phenol-formaldehyde resin, urea-formaldehyde resin, melamine-formaldehyde resin, epoxy resin, polyimide resin, polyamide resin, polyamide imide resin, polyether sulfone resin, silicone resin, etc. The combination of a carboxylic acid dianhydride (e.g. pyrromellitic acid dianhydride, benzophenonetetracarboxylic aicd dianhydride) with a dianiline (e.g. oxydianiline, methylenedianiline) which can form a polymide resin may be also used as the film forming material. Among them, the use of polyimide resin, polyamide resin or polyamideimide resin is favorable from the viewpoint of the strength of the coating film as prepared from the organosol composition (2).

In the organosol composition (2), the weight proportion of the fluorine-containing copolymer and the organic liquid medium is usually from about 5:95 to 50:50, preferably from about 20:80 to 40:60. When a film forming material is used, the weight proportion of the modified tetrafluoroethylene and the film forming material is usually from about 5:95 to 90:10, preferably from about 30:70 to 70:30. When the content of the fluorine-containing copolymer in the organosol composition (2) is within the range as above defined, the resulting coating film affords good lubricity. When the film forming material is contained within said range, the resultant coating film gives high mechanical strength.

The solid components in the organosol composition (2) may be precipitated after storage over a long period of time, but they can be readily redispersed by agitation.

The organosol composition (2) of the invention can be also obtained by treating the aqueous dispersion (1) in the manner, for instance, as described in U.S. Pat. No. 2,593,583 to give coagulated particles of the fluorine-containing copolymer and dispersing such coagulated particles into an organic liquid medium by a per se conventional dispersing procedure such as mechanical agitation or ultrasonic vibration.

The organosol composition (2) may be, with or without incorporation of an additive(s) as conventionally employed, applied to any substrate material such as metal (e.g. aluminum, iron), paper or cloth by spraying, brushing, dipping or the like to give a coated or impregnated material. Such coated or impregnated material shows excellent physical properties and therefore can be used as household furnishings or industrial articles including kitchen utensils, shaping molds, tent materials and boilers.

The organosol composition (2) may be cured at room temperature, but application of heating (e.g. 100° to 250° C.) can complete curing within a shorter period of time.

DESCRIPTION OF THE PREFERRED EMBODIMENTS

The present invention will be explained further in detail by following examples wherein part(s) and % are by weight unless otherwise indicated.

EXAMPLE 1

Preparation of the aqueous dispersion (1):

In a 3 liter stainless steel autoclave equipped with an anchor-wing type stirrer, a baffle and a thermometer, deionized and deoxidized water (1.45 liters), commercially first grade liquid paraffin (90 g) and ammonium perfluorooctanoate (1.5 g) were charged. While the mixture was kept at 70° C., the interior atmosphere was replaced with gaseous nitrogen three times and with TFE twice.

Hexafluoropropene (HFP) (0.2 g) was injected into the autoclave, and then TFE was introduced therein to make a pressure of 9.0 kgf/cm². While stirring the mixture, an aqueous solution (50 ml) of ammonium persulfate (80 mg) was added thereto, whereby polymerization was initiated. During the polymerization, stirring was continued at 280 rpm and the polymerization temperature was kept at 70° C. TFE was successively injected into the autoclave to make a pressure of 9.0 kgf/cm². When 290 g of TFE was consumed (for about 2.2 hours), the injection of TFE was stopped. Immediately thereafter, a gaseous mixture of CTFE and TFE containing 11% by mol of CTFE was injected from another line into the autoclave to make a pressure of 9.0 kgf/cm². When 240 g of the gaseous mixture was consumed (for about 6.7 hours), the polymerization was stopped, and a residual gaseous mixture was purged. During the polymerization, the concentration of CTFE in the autoclave was kept to be from 5 to 6% by mol.

The average diameter of the colloidal particles in the resultant aqueous dispersion was 0.21 micrometer. The solid content of the aqueous dispersion as determined by the evaporation-to-dryness method was 26.1%.

The solid material obtained by evaporation to dryness was thermopressed at 350° C. for 15 minutes to make a film of 50 micrometer in thickness. The content of CTFE in the copolymer calculated by multiplying the ratio of the absorbances at 957 cm$^{-1}$ and at 2360 cm$^{-1}$ by 0.58 (determined from the calibration curve based on the TFE/CTFE copolymers having known monomeric ratios) was 3.9%, from which the CTFE content in the shell portion of the resultant colloidal particle was determined to be 8.6% (=(290+240)×3.9/240) and the weight ratio of the shell portion to the core portion was calculated to be 45/55.

EXAMPLES 2 AND 3

Preparation of the aqueous dispersions (1):

The operation was carried out in the same manner as in Example 1 but the amount of TFE forming the core portion was 220 g, the CTFE content in the gaseous mixture of TFE and CTFE forming the shell portion was 8% by mol and the amount of the gaseous mixture was 330 g in Example 2, or the amount of TFE forming the core portion was 520 g, the CTFE content in the gaseous mixture of TFE and CTFE forming the shell portion was 80% by mol and the amount of the gaseous mixture as 30 g in Example 3, whereby the aqueous dispersion (1) was obtained.

In the aqueous dispersions (1) according to Examples 2 and 3, the CTFE content in the copolymer was 3.1% and 2.5%, the weight ratio of the core portion to the shell portion was 60/40 and 5/95 and the CTFE content in the shell portion was 5.2% and 46%, respectively.

EXAMPLES 4 TO 6

Preparation of the organosol compositions (2):

n-Hexane (135 parts) (the phase transfer liquid) was added to each (385 parts) of the aqueous dispersions (1) as obtained in Examples 1 to 3. Acetone (275 parts) (the phase transfer agent) was added to thereto while stirring. After stirring for 5 minutes, the mixture was allowed to stand, and a supernatant was removed. Then, methyl isobutyl ketone (300 g) was added to the remaining precipitate, and the precipitate was heated at about 100° C. while stirring to eliminate the residual water therein, whereby an organosol composition (2) (333 parts) having a solid content of 30% and containing about 0.02% of water (determined by the Karl-Fischer method) was obtained.

TEST EXAMPLES 1 TO 3

Polyamideimide resin (manufactured by HITACHI KASEI Co. Ltd.; "HI-400") (370 parts), carbon (manufactured by Columbia Carbon Co. Ltd.; "Carbon Neospectra Mark II") (6 parts) and N-methyl-2-pyrrolidone (272 parts) were added to each (333 parts) of the organosol compositions (2) as obtained in Examples 1 to 3, followed by mixing at 20° C. for 48 hours in a ball mill with 80 rpm.

The resultant mixture was filtered with a wire cloth of 150 mesh, and the viscosity was determined with Ford cup #4 to be 35 seconds.

The mixture was sprayed on a degreased aluminum plate at a spray pressure of 3 kg/cm² using a spray gun with a nozzle diameter of 0.8 mm. Then, the aluminum plate was dried in an infrared dryer at 80° C. for 30 minutes and sintered in an electric oven at 230° C. to make a test sample having a coating film.

The coating film was subjected to determination of thickness, a Taber abrasion test and a hydrothermal test according to the following procedures. On the Taber abrasion test, slippage (friction coefficient) and anti-staining (oil- and water-repellence) were determined before and after the test. The results are given in Table 1. The organosol compositions (2) used in Test Examples 1 to 3 corresponded to those prepared by the use of the aqueous dispersions (1) as obtained in Examples 1 to 3.

Thickness of the coating film:

Determined by the use of a high-wavelength thickness measuring apparatus (available from Ket Science Research Co. Ltd., TYPE ES8e3KB4).

Taber abrasion test:

The weight decrease in mg of the coating film after 1000 times of abrasions was determined by the use of a Taber abrasion test machine (abrasion ring, CS 17; load, 1 kg; 1000 rotation).

Hydrothermal test:

After immersion of the test sample in hot water at 90° to 95° C. for 1000 hours, observation was made on the occurence of blister.

Friction coefficient was determined by the use of a Bowden-Leben abrasion coefficient tester (steel ball, 8 mm: load, 1 kg: rate, 0.23 cm/sec).

Oil- and water-repellence:

Evaluation was made by dropping a 0.04% aqueous solution of ammonium perfluorooctanoate and n-hexadecane respectively on the coating film from an needle of 0.5 mm diameter, inclining the test sample having the coating film at 45° C. and observing macroscopically the trace of the drop as flowed.

COMPARATIVE EXAMPLE 1

The operation was carried out in the same manner as in Example 1 but an aqueous dispersion containing 50% of tetrafluoroethylene/hexafluoropropene (FEP) (manufactured by Daikin Industries, Ltd.; "ND-1") (200 parts) was used instead of the aqueous dispersion (1) as obtained in Example 4 to give an organosol composition.

COMPARATIVE EXAMPLE 2

The operation was carried out in the same manner as in Example 1 but after the mixture was heated to 70° C., the interior atmosphere was replaced with gaseous nitrogen three times and with a gaseous mixture of TFE and CTFE containing 3.5% by mol of CTFE twice.

Then, the gaseous mixture was injected to make a pressure of 9.0 kgf/cm², and polymerization was effected for 6 hours, during which the pressure was kept at 9.0 kgf/cm² to give an aqueous dispersion of copolymer particle having a solid content of 27.0% and an average particle diameter of 0.20 micrometer. The CTFE content in the copolymer was 3.2%. By the use of the aqueous dispersion thus obtained, an organosol composition was prepared in the same manner as in Example 4.

COMPARATIVE EXAMPLE 3

The operation was carried out in the same manner as in Comparative Example 2 but a gaseous mixture containing CTFE of 11% by mol was used and the polymerization was effected for 20 hours to give a aqueous dispersion of copolymer particles having a solid content of 24.0% and an average particle diameter of 0.19 micrometer. The CTFE content in the copolymer was 9.8%. By the use of the aqueous dispersion thus obtained, an organosol composition was prepared in the same manner as in Example 4.

COMPARATIVE TEST EXAMPLES 1 TO 3

In the same manner as in Test Example 1 but using the organosol compositions as obtained in Comparative Examples 1 to 3, the operation was carried out to prepare test samples. The test samples was subjected to the same tests as in Test Example 1. The test results are shown in Table 1.

COMPARATIVE EXAMPLE 4

The operation was carried out in the same manner as in Example 1 but the amount of TFE forming the core portion was 450 g, the CTFE content of the gaseous mixture forming the shell portion was 13% by mol and the amount of the gaseous mixture was 95 g. In the aqueous dispersion as thus prepared, the solid content was 26.6%, the average particle diameter was 0.20 micrometer and the CTFE content was 1.5%. The weight ratio of the shell portion to the core portion was 17/83, and the CTFE content in the shell portion was 8.6%.

By the use of the aqueous dispersion as obtained above, an organosol composition was tried to prepare in the same manner as in Example 4. When acetone was added to the aqueous dispersion, however, the colloidal perticles of the copolymer was coagulated. Methyl isobutyl ketone was added to the mixture, and heating was carried out to remove water, but an organosol composition giving a satisfactory dispersion state was not produced.

TABLE 1

| Test Example | Thickness of coating film (micrometer) | Taber abrasion (mg) | Friction coefficient | Water- & oil-repellence[*1] | Hydrothermal test |
|---|---|---|---|---|---|
| 1 | 45 | 6.5 | 0.060/0.050[*2] | O/O[*2] | no blister |
| 2 | 47 | 8.2 | 0.070/0.060 | O/O | no blister |
| 3 | 46 | 13.0 | 0.070/0.060 | O/O | no blister |
| Comparative 1 | 45 | 9.6 | 0.060/0.150 | O/X | ten blisters |
| Comparative 2 | 45 | 12.5 | 0.070/0.070 | O/Δ | no blister |
| Comparative 3 | 45 | 21.0 | 0.090/0.090 | O/Δ | no blister |

Note:
[*1]O: No trace; Δ: Slight trace; X: Significant trace
[*2]Each value (or symbol) before and after "/" represents one before and after Taber abrasion.

What is claimed is:

1. An organosol composition consisting essentially of an organic liquid medium and colloidal particles of a fluorine-containing copolymer having an average particle size of about 0.05 to 1.0 μm dispersed therein, each colloidal particle having a core portion made of a polymer comprising about 99 to 100% by weight of units of tetrafluoroethylene and about 0 to 1% by weight of units of at least one other fluoroolefin and a shell portion made of a polymer comprising about 50 to 97% by weight of units of tetrafluoroethylene and about 3 to 50% by weight of units of chlorotrifluoroethylene, the amount of chlorotrifluoroethylene in the core and shell portions being from about 2.5 to 25% by weight based on the entire amount of the core and shell portions.

2. The organosol according to claim 1 wherein the weight proportion of the fluorine-containing copolymer and the organic liquid medium is from about 5:95 to 50:50, respectively.

3. The organosol according to claim 2 wherein the weight proportion of the fluorine-containing copolymer and the organic liquid medium is present in an amount of from 20:80 to 40:60, respectively.

* * * * *